United States Patent
Ramey et al.

(10) Patent No.: US 7,184,544 B2
(45) Date of Patent: Feb. 27, 2007

(54) DEVICE AND METHOD FOR DETECTING PRESENCE OF SERVICE ON TELEPHONE LINE

(75) Inventors: Blaine Edward Ramey, Indianapolis, IN (US); Brian Albert Wittman, Indianapolis, IN (US)

(73) Assignee: Thomson Licensing, Boulogne - Billancourt (FR)

( * ) Notice: Subject to any disclaimer, the term of this patent is extended or adjusted under 35 U.S.C. 154(b) by 248 days.

(21) Appl. No.: 10/372,733

(22) Filed: Feb. 24, 2003

(65) Prior Publication Data

US 2004/0165718 A1    Aug. 26, 2004

(51) Int. Cl.
*H04M 1/00* (2006.01)

(52) U.S. Cl. .................. 379/413; 379/399.01
(58) Field of Classification Search ........... 379/395.01, 379/399.01, 413
See application file for complete search history.

(56) References Cited

U.S. PATENT DOCUMENTS

| | | | |
|---|---|---|---|
| 4,991,105 A | 2/1991 | Pimental | |
| 5,636,273 A * | 6/1997 | Schopfer et al. | 379/412 |
| 5,638,440 A | 6/1997 | Nix et al. | |
| 5,640,451 A | 6/1997 | Schopfer | |
| 5,737,411 A | 4/1998 | Apfel et al. | |
| 5,809,109 A | 9/1998 | Moyal et al. | |
| 5,937,033 A | 8/1999 | Bellows | |
| 6,058,161 A | 5/2000 | Anderson | |
| 6,144,722 A | 11/2000 | Anderson | |
| 6,301,227 B1 | 10/2001 | Antoniu et al. | |
| 6,356,624 B1 * | 3/2002 | Apfel et al. | 379/399.01 |
| 6,788,953 B1 * | 9/2004 | Cheah et al. | 379/158 |
| 6,904,142 B1 * | 6/2005 | Tanaka | 379/221.04 |
| 6,931,121 B1 * | 8/2005 | Tiso et al. | 379/399.01 |
| 2002/0090080 A1 * | 7/2002 | Tiernan | 379/412 |

OTHER PUBLICATIONS

Lucent Technologies, Microelectronics Group, "Loop Testing per TA-909 with the L9310/L9311 SLIC Circuit", Application Note, Jan. 2001, pp. 2-50.

Duncan Ashworth, "Testing the subscriber loop in broadband-telephony applications" EDN, Jul. 19, 2001, pp. 81-85.

* cited by examiner

*Primary Examiner*—Jefferey F. Harold
(74) *Attorney, Agent, or Firm*—Joseph J. Laks; Robert B. Levy; Joseph J. Kolodka

(57) ABSTRACT

A device and a method for detecting presence of service on a telephone line prior to and during activation of alternative service on the line. The method comprises performing a first voltage detection on a subscriber line (S20), activating a subscriber line interface circuit (SLIC) if no pre-existing service is detected (S30), the SLIC providing an interface between the subscriber line and a service provider, and performing a second voltage detection on the subscriber line after a usage-dependent time has elapsed (S60), the time being determined by heuristics which consider several factors, including usage history of the line and time of day.

11 Claims, 3 Drawing Sheets

… (continued)

DEVICE AND METHOD FOR DETECTING PRESENCE OF SERVICE ON TELEPHONE LINE

FIELD OF THE INVENTION

The present invention relates to a device and a method for detecting a foreign voltage on a telephone line, and more particularly, to a device and a method for detecting presence of service on a telephone line prior to and during activation of alternative service on the line.

BACKGROUND OF THE INVENTION

Telephone services are used in connection with broadband data such as cable modems, constant bit rate (CBR) modems in hybrid fiber-coaxial (HFC) system, and digital subscriber line (DSL) modems in twisted-pair copper systems to provide data communications. Generally, these systems provide battery, dial tone, supervisory signals, ringing and other standard Plain Old Telephone Service (POTS) signals over a two wire interface through connectors (e.g., RJ11) to telephones, facsimile machines and dialup modems.

A HFC or DSL system provides a second line service that coexists in a subscriber's residence with a primary line service, for example, an Incumbent Local Exchange Carrier (ILEC) service. The subscriber could inadvertently connect a telephone cord from the second line device (the HFC or DSL system) to a jack which is connected to the primary line service (the ILEC service). This possibly results in permanent damage to the circuitry of the ILEC central office or the HFC/DSL system. It could also interfere with proper functioning of the primary line service and could effectively disable E911 service from the residence.

One exemplary method for detecting presence of service is testing for foreign voltage on a telephone line, which detects cases of the telephone line being shorted to an AC power line or a 48V battery in a central office. However, the test can also detect the shorts between two adjacent telephone pairs in a wire bundle. For example, a voltage sensor in a second line device detects presence of DC voltage on a telephone line before a Subscriber Line Interface Circuit (SLIC) of the second line device is enabled to drive voltage onto the telephone line. If a voltage on the telephone line is above a predetermined threshold value, the SLIC is disabled. This method only works when the second line device is first enabled. However, since the connection to a primary line device could be made at any time and both the primary and second services would provide about 48V to the telephone line, the second line device would likely not be able to detect that a connection to another service has been made.

Another method for detecting presence of service is for the second line device to reverse voltage polarity on a telephone line while the primary line device provides normal polarity voltage to the line (in this case, assume no off-hook devices are connected to the line). If a primary line device is driving the telephone line, this will cause a current to flow, which will be detected as an off-hook condition. However, this method causes temporary disruption and unavailability of the telephone line and could cause temporary over-current condition in a SLIC of a device, especially if the method is performed just as a central office sends a power ring. Some line-attached devices sense line polarity reversal as a precursor to other signals, so it could cause them to malfunction. Further, the primary line device may sense a fault condition and limit the current to a level less than the hook detect level of the SLIC, which may make the test unreliable.

Yet another method for detecting presence of service is to disable the SLIC (again assume that no off-hook devices are connected). The SLIC is disabled when it is placed in a high impedance state to effectively disconnect it from the telephone line. On a telephone line with several connected devices, none of which is off-hook, the time constant due to capacitance in the telephone line and in attached devices, combined with no return path for DC currents, could be several seconds. Thus, the detection method would not be valid until a long period of time has elapsed. Since the telephone line would be out of service during that interval, this method may not be acceptable. One exemplary method for avoiding this problem is disclosed in "Loop Testing per TA-909 with the L9310/L9311 SLIC Circuit", Lucent Technologies Microelectronics Group, Application Note AP01-018ALC, January 2001. This note describes rapidly reversing voltage polarity of a telephone line just before measuring the voltage to quickly clear any charge on the line. In the note, the polarity is reversed every 150 usec during an interval of 100 msec.

A further method for detecting presence of services is detecting temperature fault in a SLIC. The temperature fault could indicate that an external device is driving excess current into the SLIC. However, unknown causes of an over-temperature fault may result in damage to the SLIC or central office, and can disturb a telephone line for a long period of time.

Thus, a need exists for a method of detecting presence of service without damage to a SLIC or central office equipment.

SUMMARY OF THE INVENTION

According to one aspect of the present invention, a method for detecting presence of service on a subscriber line in a communications network, comprises performing a first voltage detection on a subscriber line, activating a subscriber line interface circuit (SLIC) if no other service is detected on the subscriber line, the SLIC providing an interface between the subscriber line and a service provider, and performing a second voltage detection on the subscriber line after a usage-dependent time has elapsed.

According to another aspect of the present invention, a method for detecting presence of a foreign voltage on a telephone line, comprises detecting a voltage on a telephone line and comparing the voltage with a predetermined voltage, activating a subscriber line interface circuit (SLIC) when the voltage on the telephone line is less than the predetermined voltage, wherein the SLIC provides the interface between the telephone line and a second line telephone service, deactivating the SLIC after a usage-dependent time has elapsed, and detecting a foreign voltage greater than the predetermined voltage on the telephone line.

According to a further aspect of the present invention, a device for detecting presence of service on a subscriber line in a communications network, comprises means for detecting a voltage on a subscriber line and for comparing the voltage with a predetermined voltage, means for selectively activating the device in response to the detected voltage on the subscriber line, and means for using heuristics to determine when to perform test of presence of another service, wherein presence of service is detected when the device is deactivated after the usage-dependent time has elapsed.

According to preferred embodiments of the present invention, the presence of service on a telephone line may be detected regardless of activation of a second line device without damage to the second line SLIC or a central office device.

These and other objects, features and advantages of the present invention will become apparent from the following detailed description of illustrative embodiments thereof, which is to be read in connection with the accompanying drawings.

DESCRIPTION OF PREFERRED EMBODIMENTS

Detailed illustrative embodiments of the present invention are disclosed herein. However, specific structural and functional details disclosed herein are merely representative for purposes of describing preferred embodiments of the present invention.

Figure 1:
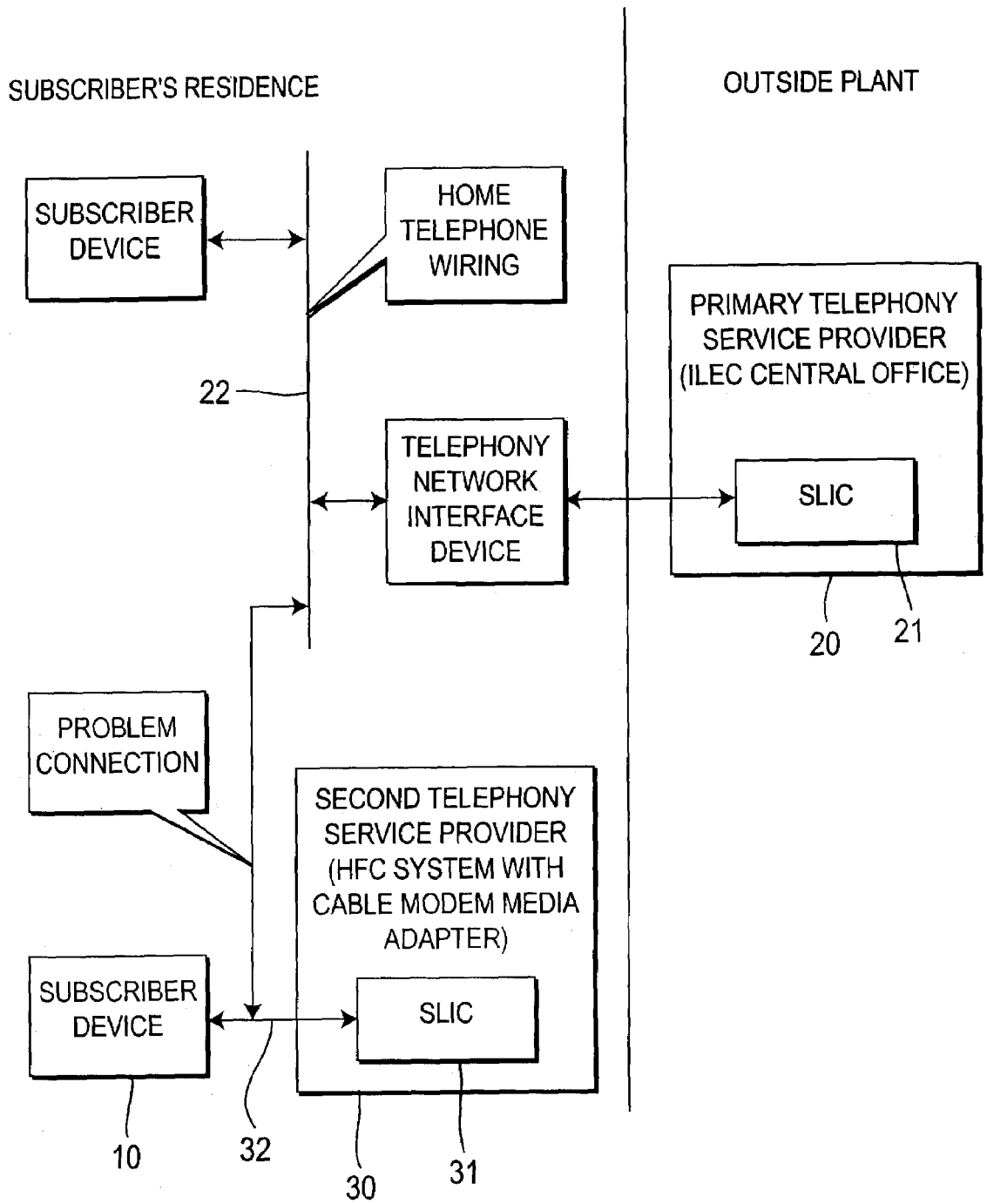
FIG. 1 is a schematic block diagram illustrating a communications network of the present invention.

FIG. 1 depicts a communications network of the present invention. A communications network comprises a subscriber device 10, e.g., telephone, fax machine, modem, or the like, and first and second telephony service providers 20 and 30 connected to the subscriber device 10 by subscriber lines 22 and 32. The telephony service providers 20 and 30 include subscriber line interface circuits (SLIC) 21 and 31. SLIC 21 in the primary telephony service provider 20 is normally part of a telephone central office. SLIC 31 in the second line service 30 is normally part of equipment installed at the subscriber's location.

The SLICs 21 and 31 provide an interface between the telephony service providers 20 and 30 and the subscriber lines 22 and 32, and perform ringing, loop current feed, dial digit detection, and two wire to four wire conversion functions. SLIC 31 includes a foreign voltage sensor adapted to detect and measure a foreign voltage present on the subscriber line 32. For example, if the voltage on the subscriber line 32 is less than a predetermined value, for example, 6V, the status of the subscriber line 32 is set as "safe to drive". If the voltage on the subscriber line 32 is greater than the predetermined value, the status of the subscriber line 32 is set as "another service present".

In a preferred embodiment of the present invention, a second voltage detection on the subscriber line 32 is performed after a usage-dependent interval to minimize disruption of service availability. Preferably, the time interval is determined by heuristic rules. The heuristic takes into account recent line usage history, time of day, and other factors.

A method for detecting presence of service, according to the present invention, is preferably performed during times of day during which calls are less likely to occur (for example, late at night) or when the connection to the second telephony service provider 30 will be changed (for example, during the first hour after the second telephony service provider device 30 is powered on, or for some time following a power outage).

Figure 2:
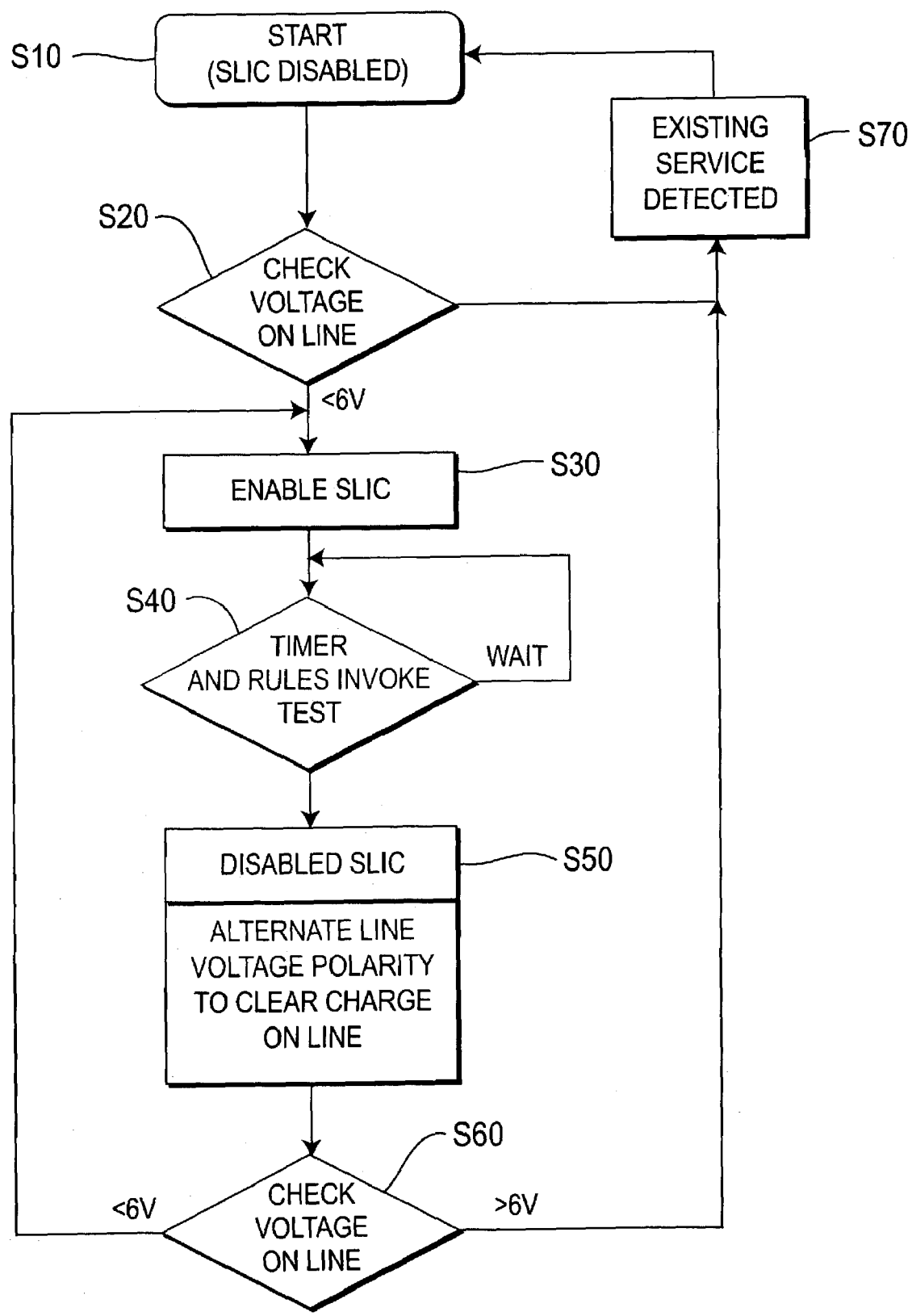
FIG. 2 is a flow chart illustrating a method for detecting presence of service, according to an embodiment of the present invention.

FIG. 2 is a flow chart illustrating the steps of a method for detecting presence of services, according to a preferred embodiment of the present invention. The SLIC 31 of the second telephony service provider 30 is disabled during the second telephony service provider 30 starting up its service (S10). The foreign voltage sensor (unshown) of the SLIC 31 detects a voltage on the subscriber line 32 (S20).

When the voltage on the subscriber line 32 is greater than a predetermined voltage, for example, about 6V, the SLIC 31 remains disabled. The voltage greater than the predetermined value indicates there is an existing service (S70), for example, the SLIC 21 of the first telephony service provider 20 providing a service. When the voltage is less than about 6V, i.e., there is no existing service, the SLIC 31 of the second telephony service provider 30 is enabled (S30).

A timer and heuristic rules determine when a second voltage detection can be performed by the SLIC 31 of the second telephony service provider 30 (S40). The heuristic rules takes into account recent line usage history and time of day in order to minimize disruption of service availability. The test checks whether the subscriber line 32 is now off hook; whether the SLIC 31 started up within last hour; whether a last call completed more than a predetermined time ago; whether a time is now low call traffic; or whether the SLIC 31 is operating from battery power or recently switched from battery power to line power. After a usage-dependent time has elapsed, the SLIC 31 is again disabled, and the voltage polarity on the subscriber line 32 is rapidly alternated to clear charge on the subscriber line 32 (S50) to perform a second voltage detection. The voltage on the subscriber line 32 is tested to determine whether the voltage is greater than a predetermined voltage, for example, about 6V (S60). If the voltage is greater than 6V, the SLIC 31 is disabled. Otherwise, the SLIC 31 is enabled and the timer and heuristics continue to select optimal times to test for presence of another service on the line.

Figure 3:
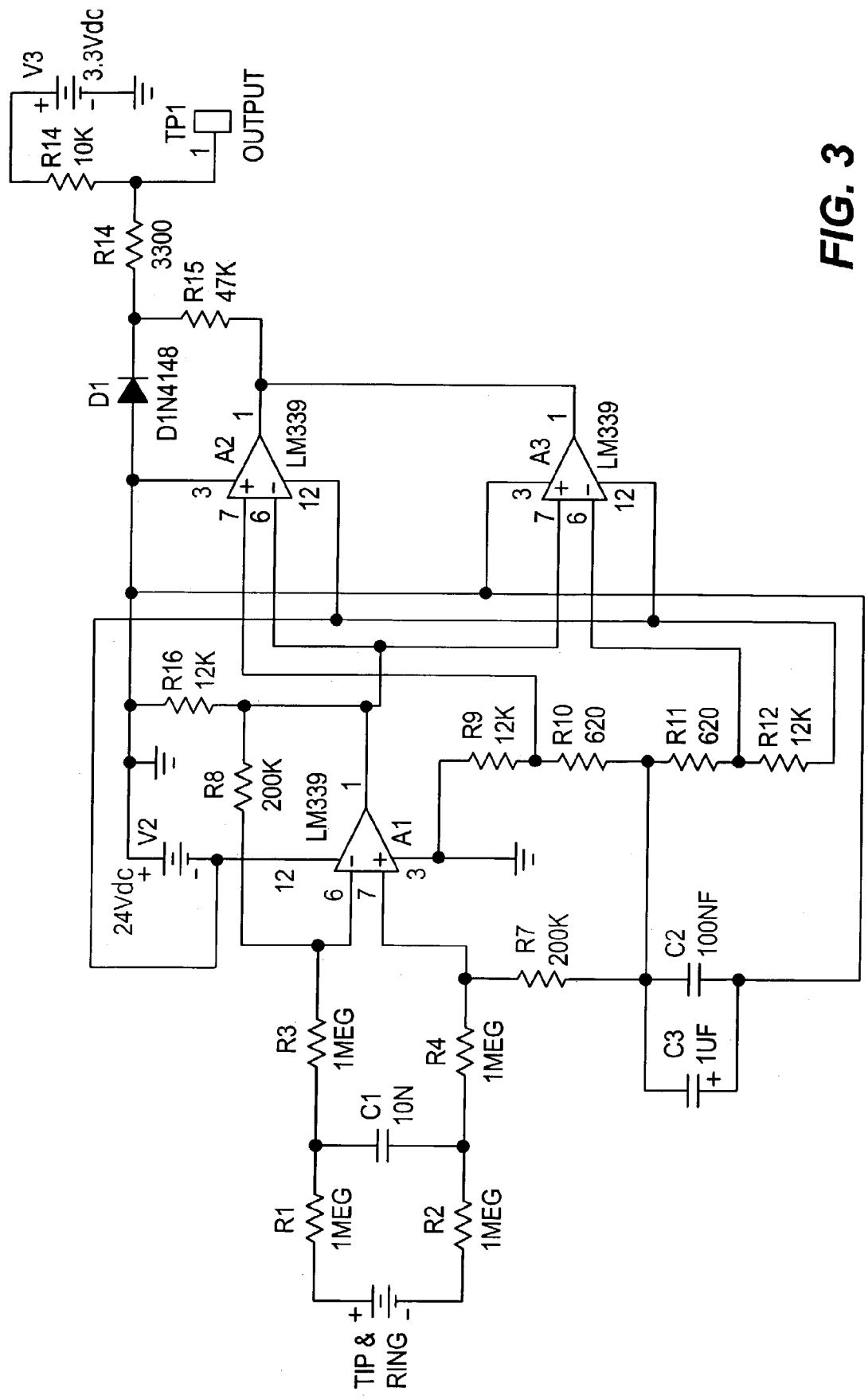
FIG. 3 is an exemplary circuit diagram embodying a method for detecting presence of service, according to an embodiment of the present invention.

FIG. 3 is an exemplary circuit diagram of a foreign voltage sensor, according to a preferred embodiment of the present invention. Preferably, a sensor (unshown) of the SLIC 31 measures the ring to tip voltage of the subscriber line 32 differentially, and it senses both positive and negative polarity, because it is common for the tip and ring signal polarity to be inverted in residential wiring. In a preferred embodiment of the present invention, preferably, the sensor comprises a window comparator with difference amplifier input stage. The threshold voltage for detecting a foreign voltage is set to +/−6V, which is less than the voltage across an off-hook telephone, but is high enough to permit the subscriber line to be discharged quickly below the threshold if no other device is driving it.

In FIG. 3, V1 represents the voltage across tip and ring of the subscriber line 32. Difference amplifier A1 produces an output voltage of one tenth of the differential ring-tip voltage and applies this signal to comparators A2 and A3. The network R1, R2, C1 low-pass filters the tip and ring signal. A2 compares the A1 output to a first reference voltage from the voltage divider R9, R10, R11, R12 across power supply V2. The junction of R7, R10, R11 acts as a common reference point. If the test voltage applied to A2 is less positive than the first reference voltage, A2's output will be high impedance. If A3's output is also high impedance, there will be no current through R15, so the circuit's output signal will be pulled to the V3 supply voltage by R13. Similarly, if the test voltage from A1 to A3 is less negative than a second reference voltage. A3's output will be high impedance.

If instead the test voltage applied to A2 is more positive than the first reference voltage, A2's output will be driven to the negative supply (−24V), so the circuit output voltage will be about 0.3 V. Similarly, if the test voltage applied to A3 is more negative than the second reference voltage, A3's output will be driven to the negative supply and the circuit output will be about 0.3 V.

This forms a window comparator. If the tip and ring voltage is within a window of about −6 V to about +6 V, the circuit output will be 3.3V (high for a logic circuit input), but if the tip and ring voltage is more positive than +6V or more negative than −6V, the circuit output will be about 0.3 V (low logic input).

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for detecting presence of service on a subscriber line in a communications network, comprising the steps of: performing a first voltage detection on a subscriber line (S20); activating a subscriber line interface circuit (SLIC) if no other service is detected on the subscriber line (S30), the SLIC providing an interface between the subscriber line and a service provider; and performing a second voltage detection on the subscriber line after a usage-dependent time has elapsed (S60); and using a timer and heuristics to determine whether the usage-dependent time has elapsed, the heuristics considering one of whether the subscriber line is off hook, whether it is a time of low call traffic, whether the SLIC recently started up, whether the SLIC is operating from battery power or has recently switched from battery power to line power and when a last call on the subscriber line is completed.

2. The method of claim 1, further comprising the steps of: disabling the SLIC after the usage-dependent time has elapsed; and alternating voltage polarity on the subscriber line to clear charge on the subscriber line before performing the second voltage detection.

3. The method of claim 1, wherein the step of performing a second voltage detection on the subscriber line comprises comparing a voltage on the subscriber line with a predetermined voltage, and wherein there is an existing service when the voltage on the subscriber line is greater than the predetermined voltage.

4. The method of claim 1, wherein the second voltage detection is continuously performed to detect presence of service on the subscriber line.

5. A method for detecting presence of a foreign voltage on a telephone line, comprising the steps of: detecting a voltage on a telephone line and comparing the voltage with a predetermined voltage; activating a subscriber line interface circuit (SLIC) when the voltage on the telephone line is less than the predetermined voltage, wherein the SLIC provides an interface between the telephone line and a central office of a communications system; deactivating the SLIC after a usage-dependent time has elapsed including using heuristics which determine whether the usage-dependent time has elapsed; and detecting a foreign voltage greater than the predetermined voltage on the telephone line.

6. The method of claim 5, further comprising alternating voltage polarity on the telephone line to clear charge on the telephone line after deactivating the SLIC.

7. A device for detecting presence of service on a subscriber line in a communications network, comprising: means for detecting a voltage on a subscriber line and for comparing the voltage with a predetermined voltage; means for selectively activating the device in response to the detected voltage on the subscriber line; and means for using heuristics to determine when to perform test of presence of another service, wherein presence of another service is detected when the device is deactivated after the usage-dependent time has elapsed.

8. The device of claim 7, wherein the device is deactivated when the voltage on the subscriber line is greater than the predetermined voltage.

9. The device of claim 7, further comprising means for alternating voltage polarity on the subscriber line to clear charge on the subscriber line after the usage-dependent time.

10. The device of claim 7, wherein the means for detecting a voltage on a subscriber line and for comparing the voltage with a predetermined voltage comprises a window comparator.

11. The device of claim 10, wherein the predetermined voltage is in a voltage range from about −6V to about +6V.

* * * * *